US006970872B1

(12) United States Patent
Chandrasekaran et al.

(10) Patent No.: US 6,970,872 B1
(45) Date of Patent: Nov. 29, 2005

(54) TECHNIQUES FOR REDUCING LATENCY IN A MULTI-NODE SYSTEM WHEN OBTAINING A RESOURCE THAT DOES NOT RESIDE IN CACHE

(75) Inventors: Sashikanth Chandrasekaran, Belmont, CA (US); Roger J. Bamford, Woodside, CA (US)

(73) Assignee: Oracle International Corporation, Redwood Shores, CA (US)

(*) Notice: Subject to any disclaimer, the term of this patent is extended or adjusted under 35 U.S.C. 154(b) by 545 days.

(21) Appl. No.: 10/202,155

(22) Filed: Jul. 23, 2002

(51) Int. Cl.[7] .............................................. G06F 17/30
(52) U.S. Cl. ...................................................... 707/10
(58) Field of Search ............................... 707/200–205, 707/8–10; 709/227; 711/141, 144, 146, 158

(56) References Cited

U.S. PATENT DOCUMENTS

| | | | |
|---|---|---|---|
| 6,564,215 B1 * | 5/2003 | Hsiao et al. .................. 707/8 |
| 6,606,660 B1 * | 8/2003 | Bowman-Amuah ......... 709/227 |
| 6,658,539 B2 * | 12/2003 | Arimilli et al. ............. 711/141 |
| 6,772,155 B1 * | 8/2004 | Stegelmann .................. 707/8 |
| 6,845,384 B2 * | 1/2005 | Bamford et al. ............ 707/205 |
| 2002/0087811 A1 * | 7/2002 | Khare et al. ................ 711/146 |
| 2003/0163649 A1 * | 8/2003 | Kapur et al. ................ 711/146 |
| 2003/0177320 A1 * | 9/2003 | Sah et al. ................... 711/158 |
| 2004/0215895 A1 * | 10/2004 | Cypher ....................... 711/141 |
| 2004/0260885 A1 * | 12/2004 | Landin et al. .............. 711/144 |

OTHER PUBLICATIONS

Daehyun Kim et al., Leveraging cache coherence in active memory systems, 2002, ACM Press, Intern. Confer on Supercomputing, pp. 2-13.*
Luciano Lenzini et al., Tradeoffs between low complexity, low latency, and fairness with deficit round-round schedulers, Aug. 2004 ACM Press, vol. 12, Issue 4, IEEE/ACM Transactions on Networking (TON), pp. 681-693.*

* cited by examiner

*Primary Examiner*—Diane D. Mizrahi
(74) *Attorney, Agent, or Firm*—Hickman Palermo Truong & Becker LLP

(57) ABSTRACT

Techniques for optimistically obtaining a resource that does not currently reside in a cache associated with a node include sending a request for permission to access the resource. Before receiving a response to the request, an operation is initiated to retrieve the resource; then the response to the request is received. After receiving the response, it is determined whether the operation results in a correct version of the resource. A returned resource is received in response to the operation. If it is determined that the operation results in the correct version, then, after the returned resource is received, the returned resource is placed in the cache associated with the first node. The techniques of the current invention not only perform an optimistic read but also determine whether the results of the optimistic read are valid. When optimistic read results are valid, latency is reduced in retrieving resources.

40 Claims, 5 Drawing Sheets

TECHNIQUES FOR REDUCING LATENCY IN A MULTI-NODE SYSTEM WHEN OBTAINING A RESOURCE THAT DOES NOT RESIDE IN CACHE

FIELD OF THE INVENTION

The present invention relates to obtaining a resource, such as a logical block of data, from a relatively slower access medium and storing the resource in a cache of a relatively faster access medium. In particular, the present invention relates to reducing the time taken to obtain the resource at one node of a multi-node system that uses a mechanism to ensure consistency of the resource among the multiple nodes.

BACKGROUND OF THE INVENTION

Some databases distribute data or database processes or both among multiple nodes. Each node is a set of one or more processors with associated memory devices ("memory"). Such databases can enhance performance by moving blocks of data to be used by a processor on a local node from a relatively slower access medium, to a relatively faster access medium. The nature of the relatively faster and relatively slower access mediums may vary from implementation to implementation. For example, the relatively slower access medium may be a disk in a disk drive or volatile memory on a remote node, while the relatively faster access medium (generally referred to herein as the "cache,") may be volatile memory on the local node. Alternatively, the relatively slower access medium may be a relatively slower disk drive, while the cache is simply a relatively faster disk drive. The techniques described herein are not limited to any particular forms of access media.

In shared disk systems, multiple nodes can access the same block of data on disk. Inconsistency of data for the same data block can occur in the local caches if one node reads a data block from disk into its local cache after another node has changed the same data block in its local cache. To prevent inconsistency of data in data blocks, a lock mechanism is employed. With a lock mechanism, no operation, such as a read or a write, of a data block may begin at a node until the node receives a lock for that data block for that operation from a lock manager. The lock manager does not grant locks for operating on a particular block to a node while another node has a lock for writing to that data block. Consequently, the lock for writing is often called an "exclusive" lock. When the writing node is finished, it releases its exclusive lock to the lock manager, which may then grant locks to other nodes for that block. The lock manager may grant locks for reading a particular block to a node while another node has a lock for reading that same data block, because the data will be consistent if multiple nodes simply read the data block. The lock for reading only, without writing, is often called a "shared" lock.

While suitable for many purposes, lock mechanisms have some disadvantages. One disadvantage is that conventional lock mechanisms impose a delay on a node that performs an operation on a data block that does not already reside in the node's cache. This delay increases the latency of the system—the time between the initiation of a set of one or more operations and the completion of the set. The node requests a lock for the data block, waits for a response from the lock manager that grants the requested lock, and then begins retrieving the data block from the disk or remote location.

Typically, the amount of time expended to retrieve a data block from disk or from a remote node is substantial, consuming hundreds to thousands of microseconds ($10^{-6}$ seconds). In many systems, the amount of time to obtain a lock may also be substantial, consuming hundreds of microseconds. Thus, input and output (I/O) involving data block reads and writes for some distributed systems with lock mechanisms can significantly increase latency relative to distributed systems without lock mechanisms. In a database system limited by I/O throughput, the increased latency further limits the performance of the system. However, lock mechanisms are highly recommended in applications where data consistency is valued; so the extra latency is tolerated as the cost of data consistency.

Based on the foregoing description, there is a clear need for techniques to reduce the latency in obtaining data blocks that do not already reside in cache while providing data consistency in distributed, shared disk systems.

In general, there is a need for techniques to reduce latency in obtaining any resource that does not already reside in cache while providing for consistency of the contents of the resource. The resource need not be a data block of a database, but may be any data of a system that is capable of changing the data. For example, the resource may be a web page to be presented by a web server in response to a first request, while a page editor is running that may change the contents of the page in response to a different request. In another example, the resource may be a portion of memory provided in response to one request for memory among multiple requests for memory.

The approaches described in this section could be pursued, but are not necessarily approaches that have been previously conceived or pursued. Therefore, unless otherwise indicated herein, the approaches described in this section are not to be considered prior art merely due to their inclusion in this section.

SUMMARY OF THE INVENTION

Techniques are provided for obtaining a resource that does not currently reside in a cache of a node. In one aspect of the invention, the techniques include sending a request for permission to access the resource. Before receiving a response to the request, an operation is initiated to retrieve the resource; then the response to the request is received. After receiving the response, it is determined whether the operation results in a correct version of the resource. The entity that is requesting the resource receives a version of the resource (referred to herein as the "returned resource") in response to the operation. If it is determined that the operation results in the correct version, then, after the returned resource is received, the returned resource is placed in the cache for use.

This technique of starting the retrieval of the resource before receiving a response, such as a lock, to a request for permission to access the resource is referred to herein as an "optimistic read." The techniques described herein not only perform an optimistic read but also determine whether the results of the optimistic read are valid, in the sense of providing the correct version of the resource retrieved. If the optimistic read is not valid, then the resource retrieved from the optimistic read is not used. In one embodiment of this aspect, if the version retrieved by the optimistic read is not valid, then another operation is initiated to retrieve the resource, but only after permission is received to access the resource. When the optimistic read results are valid sufficiently often, latency is reduced in retrieving resources.

In another aspect of the invention, the techniques include a lock manager for providing consistency of contents of resources among multiple nodes. The lock manager receives, from the first node, a request for permission to access the resource. The lock manager determines first sequence data that indicates a latest version of the resource, and generates a lock for the first node for accessing the resource. A response that includes the lock and validity information based on the first sequence data is sent to the first node. The validity information is used at the first node for determining whether an operation initiated at the first node to access the resource results in a correct version of the resource.

In another aspect of the invention, techniques for obtaining a particular resource include sending multiple requests for permission to access a set of one or more resources by a set of one or more nodes, and receiving multiple responses. For a response corresponding to each request, it is determined whether (a) initiating an operation to access a requested resource before receiving the response, results in (b) a correct version of the requested resource. A performance measure is determined based on a number of the requests determined to result in correct versions of the resources. Based on the performance measure, it is determined whether to initiate the operation to retrieve the particular resource before receiving a particular response to a particular request for permission to access the particular resource.

Using embodiments of this aspect, optimistic reads are performed when the performance measure indicates optimistic reads are likely enough to be valid, and conventional reads are performed when the performance measure indicates optimistic reads are too likely to be invalid.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for obtaining a resource that does not currently reside in a cache of a node is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In particular, embodiments of the present invention are described in the context of obtaining a logical data block from disk, which is made up of one or more disk blocks used by an operating system for a node; but the invention is not limited to obtaining data blocks. Embodiments of the invention may be used to reduce latency while obtaining any resource, such that the version of the resource obtained is consistent among several nodes that share access to the resource. For example, the resource may be a web page to be presented by a web server in response to a first request, while a page editor is running that may change the contents of the page in response to a different request. In another example, the resource may be a portion of memory provided in response to one request for memory among multiple requests for memory from several processors.

Structural Overview

Figure 1:
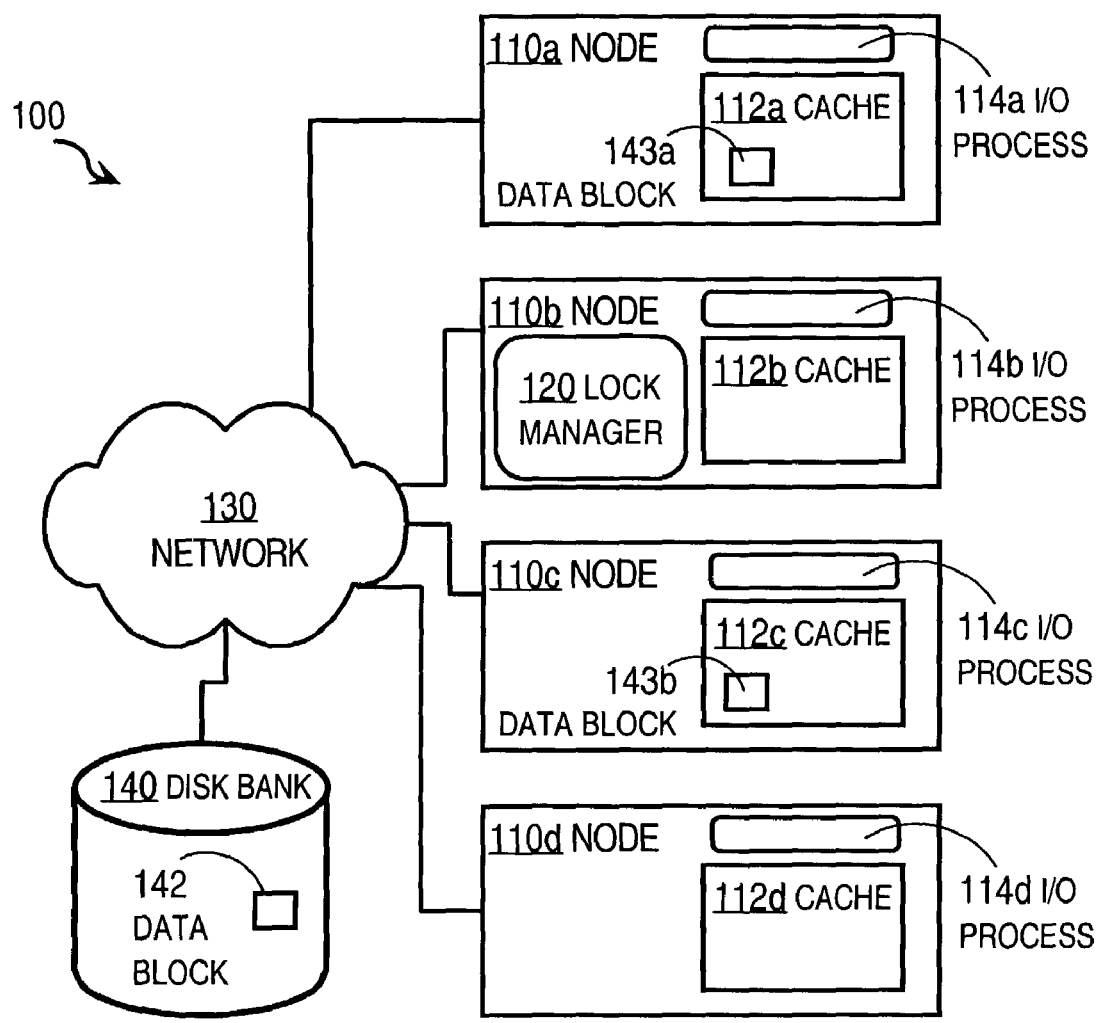
FIG. 1 is a block diagram that illustrates multiple nodes contending for access to data blocks on disk, according to an embodiment.

FIG. 1 is a block diagram that illustrates a system 100 with multiple nodes 110a, 10b, 110c, 110d (collectively referred to as nodes 110) contending for access to data blocks on disk, according to an embodiment. Each node 110 is a set of one or more processors with associated memory. Although four nodes are depicted in FIG. 1, in other embodiments more or fewer nodes may contend for access to data blocks on disk.

Executing on nodes 110a, 110b, 110c, 110d are input/output (I/O) processes 114a, 114b, 114c, 114d, respectively. The I/O processes are collectively referenced herein as I/O processes 114. Each I/O process 114 exchanges data with one or more other processes, not shown, that execute on the same node. For enhanced performance, the I/O processes 114a, 114b, 114c, 114d store in local memory caches 112a, 112b, 112c, 112d, respectively, data exchanged with other devices, such as other nodes or disks. The caches are collectively referenced herein as caches 112.

The nodes 110 are connected to network 130, through which the nodes communicate with each other and with other devices connected to the network 130. In some embodiments the network 130 is made up of direct links; in other embodiments one or more network devices are included to route or convert signals used during communication among the nodes.

Also connected to network 130 is disk bank 140 made up of one or more disks for non-volatile storage of data for system 100. Although only one disk bank is depicted in FIG. 1, in other embodiments additional disk banks may be connected to network 130. In some embodiments, a separate disk bank is connected directly to each node to serve as non-volatile storage for the directly connected node.

Stored in one or more operating system disk blocks of disk bank 140 is logical data block 142 containing information to be accessed by one or more processes executing on nodes 110. As used herein, a particular data block represents a particular location and amount of data, whether that data is stored on disk, transported over data links, or resides in the volatile memory of one or more nodes. For example, the same data that is in a particular data block 142 on disk bank 140 may also reside in data block 143a in cache 112a of node 110a and in data block 143b in cache 112c of node 110c.

In some embodiments, the I/O processes 114 assume the entire task of keeping the contents of a particular data block consistent among the nodes 110. In the illustrated embodiment, a lock manager 120 on node 110b is a separate process that assumes a portion of the task of providing consistency by granting locks for operations performed by the I/O processes 114.

Obtaining Data Blocks Without Optimistic Reads

A method using a lock manager 120 for obtaining from disk bank 140 a data block 142 not already in a local cache, without using optimistic reads, is described next. It is assumed for the purposes of illustration that the I/O process 114a on node 110a and the I/O process 114c on node 110c both attempt to read data block 142 from disk bank 140 and neither will modify the contents of data block 142. Both I/O processes 114a, 114c request from lock manager 120 read-only locks for block 142. Read-only locks are shared locks, so lock manager 120 grants shared locks to both I/O processes 114a, 114c. The I/O processes 114a, 114c then both hold shared locks for data block 142. Both retrieve data block 142 and store it in their caches 112a, 112c, respectively, as data blocks 143a, 143b, respectively.

In some embodiments, both I/O processes 114a, 114c retrieve the data block 142 from disk. In some embodiments, one I/O process retrieves data block 142 from disk into its cache, and the other I/O process receives data block from the cache of the other I/O process, based on information provided by the lock manager 120. For example, I/O process 114c receives a shared lock from lock manager 120, retrieves data block 142 from disk, and stores it as data block 143b in cache 112c. When I/O process 114a later requests a shared lock from lock manager 120, the lock manager 120 includes information in the lock that data block 142 is already in the cache 112c of node 110c. Then I/O process 114a retrieves data block 143b from the cache 112c of node 110c, and stores it as data block 143a in cache 112a.

For the purposes of illustrating exclusive locks, it is assumed that the I/O process 114a on node 110a and the I/O process 114c on node 110c both attempt to read data block 142 from disk bank 140 and at least one will modify the contents of data block 142. First I/O processes 114c requests from lock manager 120 a read-write lock for block 142. Then I/O processes 114a requests from lock manager 120 a read-only lock for block 142. A read-write lock is not shared, but is an exclusive lock, so lock manager 120 grants an exclusive lock to I/O process 114c, and places the request from I/O process 114a in a queue for a later response. The exclusive lock "blocks" the shared lock. The I/O process 114c then holds an exclusive lock for data block 142, retrieves data block 142, stores it in its cache 112c as data block 143b. It is assumed that the I/O process 114c modifies the contents of data block 143b based on operations performed by other processes, not shown, on node 110c. After the changes to data block 143b are made, the data block is written as a revised data block 142 onto disk bank 140, and the exclusive lock is released back to the lock manager 120.

When the lock manager receives a message from the I/O process 114c on node 110c releasing the exclusive lock on data block 142, the lock manager 120 grants a lock to the next request in the queue. In this example, the shared lock request of I/O process 114a is the next request in the queue, so lock manager 120 grants the shared lock request of I/O process 114a. I/O process 114a receives a shared lock from lock manager 120. In some embodiments, the I/O process 114a retrieves data block 142 from disk, and stores it as data block 143b in cache 112c. In some embodiments in which the node 110c retains a shared lock on data block 142, the lock manager 120 includes information in the shared lock that the most recent version of data block 142 is already in the cache 112c of node 110c. Then I/O process 114a retrieves data block 143b from node 110c, and stores it as data block 143a in cache 112a.

The time delay, called "latency," for completing the operation of retrieving the data block 142 without using optimistic reads is given by the sum of the lock procurement time (the time required to request and receive the lock), plus the retrieval time (the time required to start and complete the retrieval of data block 142 from disk bank 140 or from the cache of the other, "remote," node). If another node holds an exclusive lock on the requested data block, the lock procurement time can be a substantial fraction or exceed the retrieval time.

Overview of Validated Optimistic Reads

According to embodiments of the invention, optimistic reading of a data block is combined with validity checking. Any type of validity checking can be used to ensure that a correct version of a data block is retrieved with the optimistic read. Three embodiments using three types of validity checking are described herein. However, the disclosed embodiments are merely representative. The present invention is not limited to the particular embodiments disclosed.

In an embodiment using the first type of validity checking, the time that the optimistic read is started is compared to the latest time that the data block was written by any of the other nodes. If the read was started after the last write, the read is valid. This can be determined even before the read is finished, but involves the writing node publishing its write time to the other nodes. A node can publish its write time in any way, such as by broadcasting the write time to the other nodes, by storing the write time and responding to requests from other nodes, or by sending the write time to a lock manager. This type of validity checking is called "write-time" validity checking herein.

In an embodiment using the second type of validity checking, the time that the optimistic read is started is compared to the latest time that an exclusive lock on the data block was released by any of the other nodes. Because the lock is released after the data block is written, if the read was started after the last release, then the read was started after the last write and the read is valid. This can be determined even before the read is finished, and only involves the lock manager publishing the release time to the other nodes. A lock manager can publish the release time in any way, such as by storing the release time and including the latest release time with a lock in response to lock requests from other nodes. No change is needed to the writing node that released the lock. This type of validity checking is called "release-time" validity checking herein.

In an embodiment using the third type of validity checking, a value of an attribute of the data block that changes with every write is compared to the value of the attribute when any other node last wrote the data block. If the values are different, then the optimistic read is invalid. If the values are the same, the optimistic read is assumed valid. The assumption is good if the values of different versions are guaranteed to be unique, such as with a version number attribute or a value of a software clock when the data block is written. The assumption is weaker if the values of different versions cannot be guaranteed to be unique, such as with a checksum attribute. The version of the data block retrieved is not determined, however, until after the read is finished and the data block has been delivered to the node. In addition, this type of validity check involves the writing node publishing the value of the attribute to the other nodes.

A writing node can publish the attribute value in any way, such as by broadcasting the attribute value to the other nodes, by storing the attribute value and responding to requests from other nodes, or by sending the attribute value to a lock manager. This type of validity checking is referred to herein as "version number" validity checking.

In some embodiments a version number is not guaranteed to be unique. For example, if a data block is made up of several disk blocks, and one disk block containing the version number is written to disk before other disk blocks of the data block, then the version number is changed before the entire data block is changed. Agreement of version numbers will not indicate that the entire data block has been updated, and will not guarantee a valid optimistic read. Version number validity checking is weak in such embodiments.

Validated Optimistic Read Method

Figure 2:
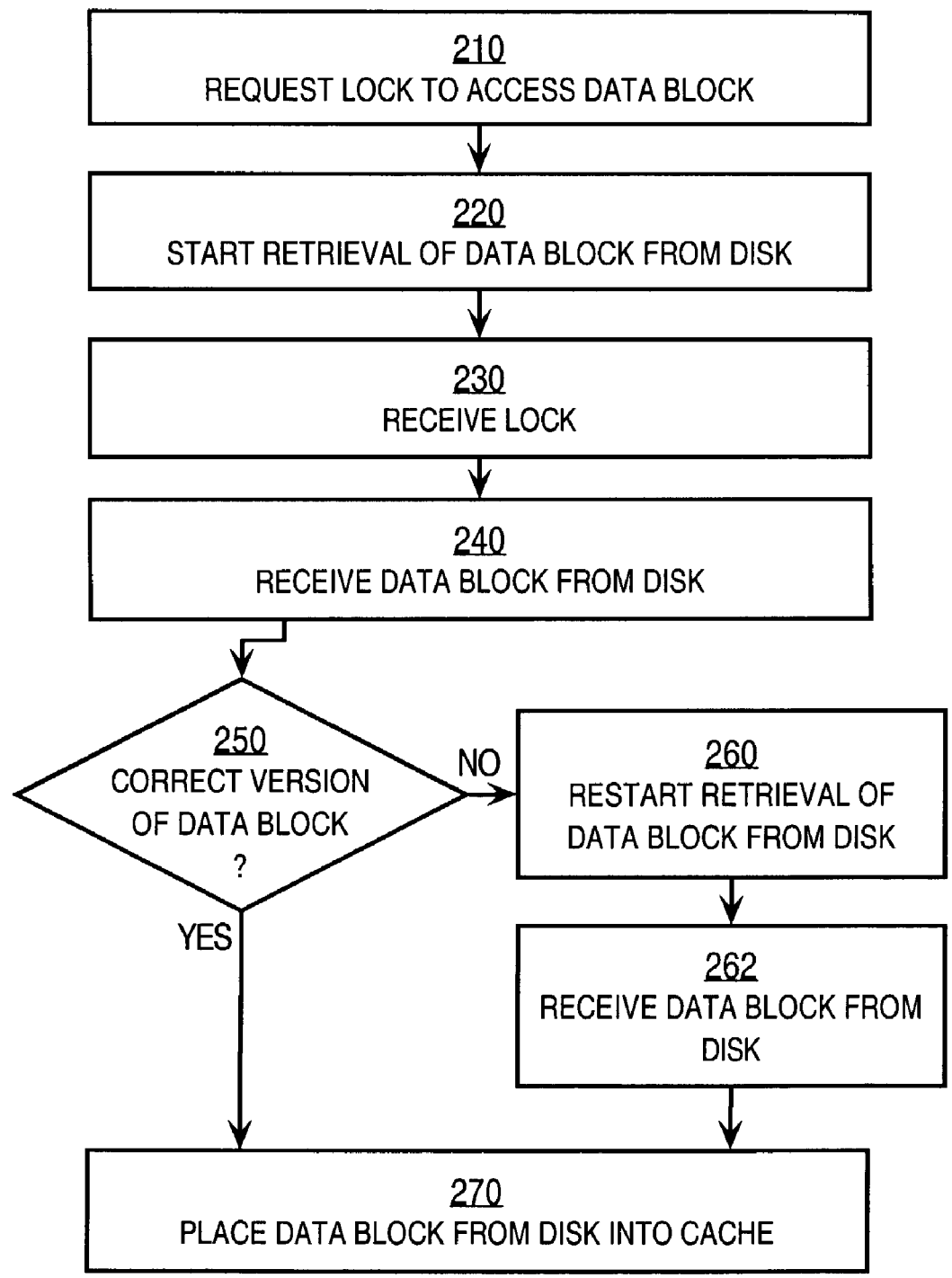
FIG. 2 is a flowchart that illustrates a method for performing an optimistic read of a data block with validity check, according to an embodiment.

FIG. 2 is a flowchart that illustrates a high-level overview of a method 200 for performing an optimistic read of a data block with validity check, according to an embodiment. Although steps are depicted in FIG. 2 and subsequent flowcharts in a particular order, in other embodiments, the steps may be performed in a different order or overlapping in time.

In step 210 a request for a lock to access a particular data block is sent. In embodiments that use a lock manager, the request is sent to the lock manager. In other embodiments, the lock manager may be omitted and the I/O processes 114 can communicate with each other to grant locks. In still other embodiments, other methods can be used to assure consistent content of a resource; and step 210 corresponds to initiating an operation to grant permission to access a resource in order to assure consistency of content of the resource. In some embodiments, a retrieval start time, indicating a time that step 220 is performed, is included in a message sent to a lock manager or the other nodes.

In step 220, retrieval of the particular data block is started. For example, a call is made to an operating system function to move data from the disc data blocks corresponding to the particular data block into a location in the memory of one of the nodes. In some embodiments the location in memory is in the cache 112 for the I/O process 114 on the node; in some embodiments the location is a buffer outside the cache 112.

In some embodiments, step 220 is performed before step 210, but in all embodiments step 220 is performed without regard to whether a lock or other response is received in response to the request sent in step 210. The retrieval of the data block is optimistic, expecting timely permission will be granted.

In step 230, a lock is received for the data block in response to the request sent in step 210. In some embodiments the lock is received from a lock manager 120. In other embodiments another message may be received, such as message from another node granting or denying permission to access the data block. A message denying permission would render the optimistic read invalid.

In some embodiments the message received in step 230 includes data indicating validity information for an optimistic read. In some embodiments, the validity information includes one or more of the write time, the release time, and an attribute value such as the version number of the data block when last written. In some embodiments, in which a retrieval start time is included in a message sent during step 210, the validity information indicates whether the optimistic read is valid. Such validity information results from a determination made by the process sending the message, such as a lock manager or the I/O process on another node, based on the retrieval start time and other information available to the process, such as the write time or the release time. The generation of validity information is described in a later section with reference to FIG. 3.

In step 240, the data block is returned in response to the operations initiated in step 220. In some embodiments, step 240 may occur before step 230. The data block is returned by the operating system in the location indicated in step 220, such as a buffer or a location in cache 112. The data block returned may be a data block 142 from disk bank 140 or a data block 143c from a remote node.

In step 250 it is determined whether a version of the data returned in step 240 is the correct version of the particular data block, i.e., whether the data block returned in step 240 is valid. The determination of step 250 is based, at least in part, on information received during step 230.

In some embodiments, such as embodiments using "write-time" or "release-time" validity checking, step 250 is performed immediately after step 230, often before step 240, and without regard to any information received in step 240. In such embodiments, the determination is based on information received during step 230, or generated during step 220, or both. For example, in embodiments in which the determination is made by the process that sent the message received in step 230, then step 250 involves determining whether the validity information received in step 230 indicates an optimistic read is valid.

In some embodiments, in which the validity information includes the write time, step 250 involves determining whether the write time is not later than the retrieval start time. In some embodiments, in which the validity information includes the exclusive lock release time, step 250 involves determining whether the release time is not later than the retrieval start time.

In some embodiments, such as embodiments that use version-number validity checking, step 250 is not performed until after the particular data block is returned in step 240, and is based on information in the data block returned, such as the version number of the returned data block. In embodiments in which the validity information includes the version number of the last write, step 250 involves determining whether the version number of the last write is not later than the version number of the returned data block. In embodiments in which the validity information includes the checksum of the last write, step 250 involves determining whether the checksum of the last write is not different from the checksum of the returned data block.

If it is determined in step 250 that the particular data block returned in step 240 is valid, control passes to step 270 to place the data from the returned data block 142 into cache 112. In some embodiments in which the operating system automatically returns the data block to the cache 112, the data block is left in cache 112 in step 270.

If it is determined in step 250 that the particular block returned in step 240 is not valid, then control passes to step 260. In step 260, the operation to retrieve the particular block from disk or a remote cache is started again, based on permission received in step 230. Because permission has been received in step 230 before performing step 260, the data block received in response to step 260 will be valid. In embodiments in which permission is not received in step 230, such as embodiments in which a message denying permission to access the particular data block is received in step 230, step 260 is delayed until permission is received. Control then flows to step 262. In some embodiments in which the operating system automatically returns the data block to the cache 112, the data block is removed from cache 112 in step 260.

In step 262, the particular data block is received from disk or the remote node. Control then passes to step 270 to place (or leave) the particular data block in cache 112.

Using the method of FIG. 2, the latency for completing the operation of retrieving the data block 142 is not given by the sum of the lock procurement time to request and receive the lock plus the retrieval time to start and complete the retrieval of data block 142 from disk bank 140 or from the remote node, as in the conventional method. Instead, if the optimistic read is valid, the latency is given by the greater of the lock procurement time and the retrieval time, not the sum, plus any extra time to determine validity. The greater of the two times can be several percent (up to 50%) less than the sum; therefore the latency is substantially reduced if the optimistic read is valid. It is expected that optimistic reads will often prove valid, especially in databases in which a very small percentage of data blocks are being written at any one time.

However, if an optimistic read is invalid, the latency is given by the sum of the two times, plus any extra time to determine the validity. In this case the latency is about the same to somewhat greater than the latency of the non-optimistic method.

In embodiments that use version-number validity checks, validity is not determined until after the optimistically read data block is retrieved. Then, if the optimistic read is invalid, retrieval must be performed again. The total time is twice the retrieval time. Since retrieval time is often several times greater than lock procurement time, this latency can be much worse than in the non-optimistic method.

Effects of Unsynchronized Clocks

If the clocks used by the different nodes are not synchronized, the clocks on the different nodes may differ by an amount up to a deviation tolerance amount, designated herein by the symbol $\Delta CT$. The write-time and the release-time validity checks may be affected by clock differences. For example, the retrieval start time may appear to be after the release time by an amount smaller than $\Delta CT$ even when the actual retrieval start time is before the release time.

To ensure that only valid optimistic reads are determined to be valid, in some embodiments using the write-time or release-time validity checks in which validity is not determined by a separate process, at least one of the write time, the release time and the retrieval start time are reset during step 250 based on the clock tolerance.

For example, in some embodiments, the retrieval start time is decreased by $2*\Delta CT$. This is equivalent to decreasing the retrieval start time by $\Delta CT$ and increasing the write time or release time by $\Delta CT$, which assumes the retrieval start time is as early as possible and the write time and release time are as late as possible. This is also equivalent to increasing the write time and the release time by $2*\Delta CT$. An optimistic read found valid under these conditions is valid no matter what the actual clock differences are within the tolerance.

Validated Optimistic Read at a Lock Manager

Figure 3:
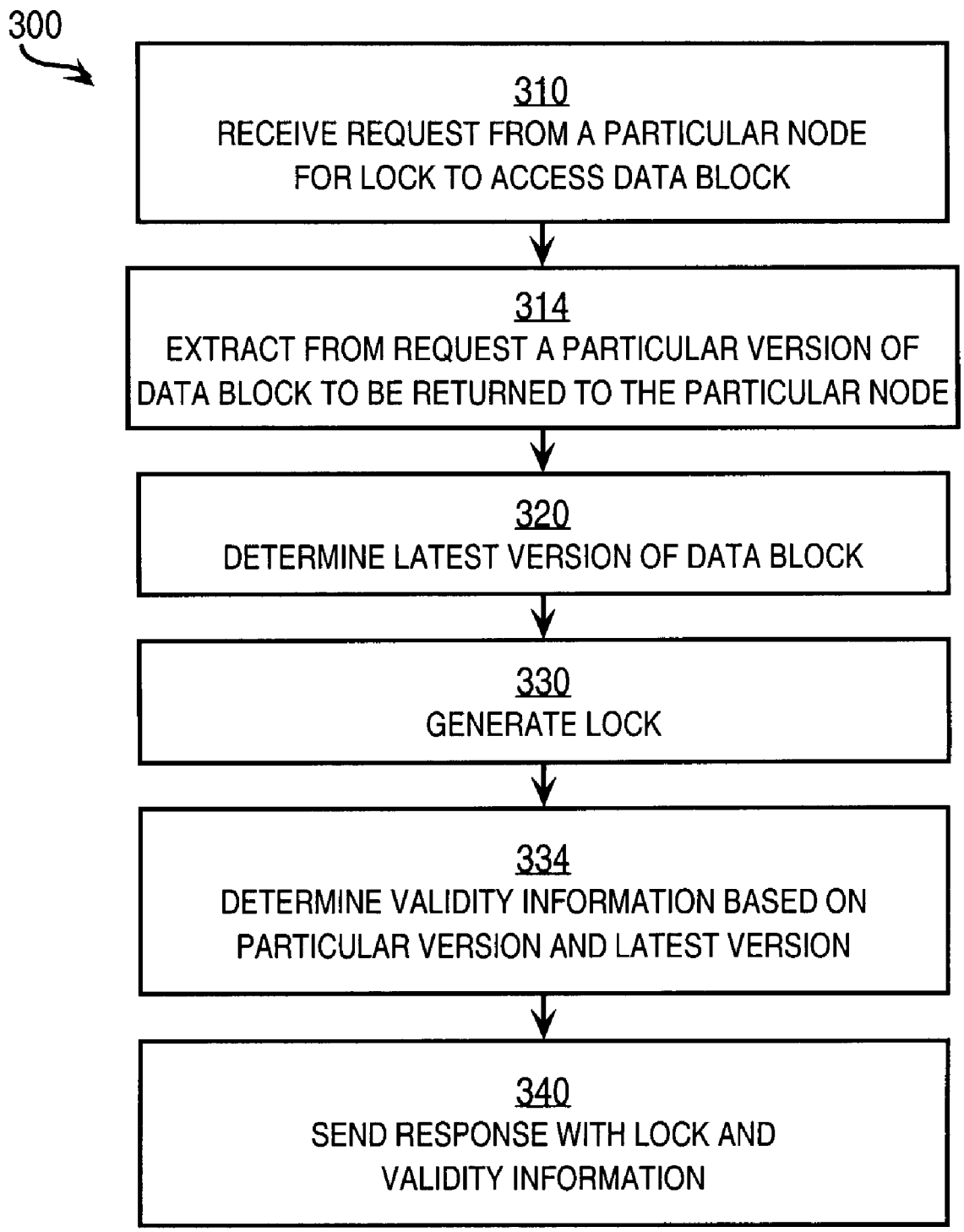
FIG. 3 is a flowchart that illustrates a method for performing an optimistic read of a data block with validity check at a lock manager, according to an embodiment.

FIG. 3 is a flowchart that illustrates a method for performing an optimistic read of a data block with validity check at a lock manager, according to an embodiment. Though described for a lock manager, any process granting permission to access a resource can perform similar steps. The steps can be performed by a lock manager on the same or a different node, or by an I/O process 114 on a different node.

In step 310, the lock manager receives a request from a node for a lock to access a data block.

In step 314, data indicating a particular version of the data block is extracted from the request. The particular version is associated with an optimistic read. Step 314 is performed in embodiments in which the lock manager determines whether an optimistic read is valid. In some embodiments, the data indicating the particular version of the data block is data indicating the retrieval start time. In embodiments in which the validity determination is made by the requesting node, step 314 may be omitted.

In step 320, the lock manager determines the latest version of the data block based on the last-released exclusive lock for the data block. If another node holds an exclusive lock for the data block, or receives an exclusive lock before a lock is granted to the requesting node, step 320 includes waiting until the other node releases the exclusive lock. The lock manager may use any method to associate a latest version with the data block. For example, the lock manager may store the data blocks having the most recently released exclusive locks in a circular buffer. The earliest version for any data block in the circular buffer is herein called the "earliest circular buffer version."

In embodiments in which release-time validity checks are used, the release time indicates the latest version of the data block. The lock manager records the time when an exclusive lock is released and retrieves that time when a subsequent request for a lock for that data block is received, as described in more detail in the next section.

In embodiments in which write-time validity checks are used, the write time indicates the latest version of the data block. The lock manager records the write time sent from a writing node when the writing node releases an exclusive lock. The lock manager stores the write time in association with the data block. When a subsequent request for a lock for that data block is received, the lock manager retrieves the write time associated with that data block.

In embodiments in which version-number validity checks are used, the attribute value, such as the value of the version number or the checksum, indicates the latest version of the data block. The lock manager records the attribute value returned from a writing node when the writing node releases an exclusive lock. The lock manager stores the attribute value in association with the data block. When a subsequent request for a lock for that data block is received, the lock manager retrieves the attribute value associated with that data block.

In step 330, the lock manager generates the lock granting permission for the node to read the data block. For example, the lock manager grants an exclusive or a shared lock to the requesting node for the requested data block.

In step 334, the lock manager determines the validity information. In embodiments in which the validity determination is made by the requesting node, the validity information includes data indicating the latest version of the data block, such as one or more of the write time, the release time, the version number, a software clock number, and the checksum. In some of these embodiments using a circular buffer to store the latest version of the most recently released data blocks, the validity information includes the earliest circular buffer version.

In embodiments in which the lock manager makes the validity determination, the validity information includes data indicating whether an optimistic read is valid or invalid. The lock manager determines that the optimistic read is valid if the particular version of the data block extracted in step 314 is not before the latest version of the data block. If the lock manager uses a circular buffer that only stores the most recently released data blocks, the optimistic read is assumed to be invalid if the particular version extracted in step 314 is before the earliest circular buffer version.

In embodiments employing the write-time validity checks, the lock manager determines whether the retrieval start time is not before the write time associated with the data block, accounting for any differences among clocks of the nodes, as described above for step 250. If the data block is not in the circular buffer, the lock manager determines whether the retrieval time is not before the write time of the earliest circular buffer version, again accounting for any differences among clocks.

In embodiments employing the release-time validity checks, the lock manager determines whether the retrieval start time is not before the release time associated with the data block, accounting for any differences among clocks of the nodes, as described above for step 250. If the data block is not in the circular buffer, the lock manager determines whether the retrieval time is not before the release time of the earliest circular buffer version, again accounting for any differences among clocks.

In embodiments employing the version-number validity checks, the lock manager should not determine the validity, because the values of the attributes in the data block returned to the requesting node is not available when the request for a lock is made in step 210 of FIG. 2.

In step 340, the lock and the validity information are sent to the requesting node.

Example of Validated Optimistic Read

The methods of FIG. 2 and FIG. 3 are further illustrated in this section with a particular example. In this illustrated example, it is assumed that a release-time validity check is used with a lock manager 120 and unsynchronized clocks having a ΔCT of 100 microseconds, and that the lock manager makes the validity determination. It is further assumed that the four nodes of FIG. 1 share access to disk bank 140, and that node 110c most recently had an exclusive lock on data block 142, which is stored as data block 143b in cache 112c. It is further assumed that lock manager 120 on node 110b uses a circular buffer to store information about 1024 data blocks with the most recently released exclusive locks, and that the release time of the earliest released exclusive lock still stored in the circular buffer is the circular buffer earliest release time designated herein by the symbol CERT. An example sequence of events, described below, is summarized in Table 1.

At time T1, in step 220, I/O process 114a on node 110a performs an optimistic read by calling an operating system routine to retrieve data block 142 from disk bank 140 and place the returned data block into cache 112a as data block 143a. T1 is the retrieval start time. At time T2, greater than (i.e., after) time T1, in step 210, I/O process 114a on node 110a sends a request to the lock manager for a shared lock on data block 142. The request includes a particular version of the optimistic read indicating the retrieval start time T1.

TABLE 1

An example sequence of steps for an optimistic read determined to be invalid.

| Time | Step | Description |
| --- | --- | --- |
| T1 | 220 | Node starts optimistic read. |
| T2 | 210 | Node requests lock. |
| T3 | 310 | Lock manager receives lock request. |
|  | 314–334 | Lock manager determines validity of an optimistic read. |
| T4 | 340 | Lock manager sends message with lock and data indicating the optimistic read is invalid. |
| T5 | 230 | Node receives message with lock and indication of invalidity. |
|  | 250 | Node determines optimistic read is invalid. |
| T6 | 260 | Node starts a valid read. |
| T7 | 240 | Node inserts invalid optimistic data block into cache. |
| T8 | 262 | Node receives valid data block in temporary buffer. |
|  | 270 | Node replaces invalid data block in cache with valid data block from temporary buffer. |

At time T3, after time T2, in step 310, the lock manager 120 receives the request for a shared lock on data block 142 that includes the retrieval start time T1.

In step 314, the lock manager extracts the retrieval start time T1 from the request. In step 320, the lock manager determines the latest version of the data block 142. During step 320, the lock manager determines whether any node has an exclusive lock on data block 142.

If a holding node holds an exclusive lock on data block 142, the optimistic read is invalid; and the lock manager determines validity information that indicates that the optimistic read is invalid. The lock manager waits for the holding node to release the exclusive lock as in a conventional lock manager.

After the exclusive lock is released, a reference to the data block, such as a data block identification (ID), and the associated release time are added to the circular buffer. If the data block ID is already in the circular buffer, the release time associated with the data block ID is updated. If the data block ID is not in the circular buffer, the oldest data block ID is dropped from the circular buffer and replaced by the data block ID for which an exclusive lock was just released. A pointer indicates the circular buffer position that holds the earliest release time, equal to CERT. The block ID for data block 142 and the release time for the exclusive lock on data block 142 are inserted at the position indicated by the pointer. The pointer is moved to the position holding the earliest release time remaining in the circular buffer, and the value of the release time in the new pointer position is used as a new value of CERT.

After any exclusive lock on data block 142 is released, control passes to step 330 to grant a shared lock as in a conventional lock manager.

If no node holds an exclusive lock, during step 320, the lock manager checks the circular buffer to determine when the last exclusive lock on data block 142 was released. Any method may be used to find a particular block ID in the circular buffer. In one embodiment, every entry in the circular buffer is searched to find the block ID. In another embodiment, the block ID is input to a hash function to produce a hash key. A hash table lists, for each hash key, one or more block ID values and associated positions in the circular buffer, so that only one row of the hash table is searched to find the block ID in the circular buffer. When an exclusive lock on data block 142 is released and the block ID for data block 142 is not found in the circular buffer, as described above, the block ID of data block 142 is input to the hash function; and the row of the hash table with the resulting hash key is updated to include the block ID of data block 142 and its position in the circular buffer. Similarly, the hash table is updated to remove the reference to the data block just dropped from the circular buffer to allow a reference to data block 142 to be added.

If the block ID for data block 142 is found in the circular buffer, then the release time, designated by the symbol "RT," associated with the block ID is used as the latest version of data block 142. RT is also the time that node 110c released its exclusive lock on data block 142, in this example.

If the block ID for data block 142 is not found in the circular buffer, then the latest version of the data block is set to the value of CERT, the earliest release time in the circular buffer, which is indicated by the pointer. As stated above, if the block ID is not in the circular buffer, then the latest version of the data block is set to the value of CERT even though the data block might have been released much before CERT, and the optimistic read might be valid. However, to ensure that no invalid optimistic read is allowed to stand, the latest version is set to the value of CERT. For example, if CERT is 2345 microseconds and T1 is 2000 microseconds, then the optimistic read started in step 210might be invalid, because data block 142 might have been updated at a time after T1 but before CERT, such as at 2111 microseconds.

In step 330, the lock manager grants a shared lock as in a non-optimistic lock manager.

In step 334, the lock manager determines the validity of the optimistic read by determining whether the retrieval start time T1 is not earlier than the latest version. The latest version is RT if the block ID for data block 142 was found in the circular buffer during step 320, and the latest version is CERT if the block ID for data block 142 was not found in the circular buffer during step 320. For purposes of illustration, it is assumed that the latest version is RT, the time of release of data block 142 by node 110c.

If RT is later than T1-2*$\Delta$CT, then the lock manager determines that the optimistic read is invalid and includes in the validity information data indicating that the read is invalid. Because of differences between the clock of node 110b with the lock manager and the clock of node 110a which started the retrieval, the retrieval might have been started before the lock was released. If T1-2*$\Delta$CT is later than RT, then the lock manager determines that the optimistic read is valid and includes in the validity information data indicating that the read is valid. If the latter condition is satisfied, then the retrieval started after the lock was released even assuming the most disadvantageous difference in the clocks.

For example, if RT is 444000 microseconds and T1 is 444155 microseconds and $\Delta$CT is 100 microseconds, then $$T1\text{-}2^*\Delta CT=444155\text{-}2^*100=443955,$$

and

RT=444000 is later than 443955.

Therefore, RT is later than T1-2*$\Delta$CT and the optimistic read is invalid. The lock manager includes data indicating the optimistic read is invalid in the validity information.

In step 340, at time T4 after time T3, the lock manager sends the validity information, including the data indicating the optimistic read is invalid, and the shared lock for data block 142 in a response to the requesting node 110a. If the updating node 110c retains a shared lock on data block 142, then, in some embodiments, the response may include the node ID for node 110c so that node 110a may retrieve the data block from the cache 112c of node 110c instead of from data bank 140. In other embodiments, the data block might be sent directly from the cache 112c to a node 110a buffer indicated in the request by way of a direct memory transfer.

In step 230, at time T5 after time T4, the I/O process 114a on requesting node 110a receives the message with the shared lock for data block 142 and the data indicating the optimistic read is invalid. In step 250, the I/O process determines that the data block to be returned in response to the call made at time T1 will be invalid. In some embodiments, the operation started in step 220 at time T1 is cancelled during step 250. Control passes to step 260.

In step 260, at time T6 after T5, I/O process 114a on node 110a calls the operating system routine to retrieve data block 142 from disk bank 140 and place the returned data block into a temporary buffer. This read will be valid because the I/O process 114a now holds a shared lock for reading the data block 142.

In step 240, at time T7, most likely occurring after T6, the data block 142 is placed into cache 112a as data block 143a, based on the operation started in step 220 at time T1. This data block is invalid as it started retrieval before the lock manager had received the release of the exclusive lock. This step is omitted in embodiments in which the operation is canceled in step 250, unless the operation completes before step 250.

In step 262, at time T8, most likely after time T7, data block 142 is received in the temporary buffer based on the retrieval operation begun in step 260. Control passes to step 270. In step 270, the data block in the temporary buffer is placed into cache 112a as data block 143a, overwriting the invalid data block placed there during step 240 in response to the optimistic read.

In some embodiments, when a lock for a data block is issued to node 110a, the data block is transferred directly to the temporary buffer, such as in a private scratch memory, of node 110a block from cache 112c of node 110c having a shared lock on the data block. This direct transfer is called herein a "remote memory copy operation." If an optimistic read is valid, the remote memory copy operation can be cancelled and the temporary buffer deleted. If the optimistic read is invalid, the data block is copied from the temporary buffer to the cache 112a. The copying from the temporary buffer to the cache and deletion of the temporary memory can be avoided in some embodiments. For example, two buffers in the cache 112a can be selected from a free list of available buffers. One can be designated the destination for the optimistic read and the other as the destination for the remote memory copy operation. The outcome of the validity determination determines which buffer is marked as holding the latest version of the data block. The other buffer is returned to the free list.

As demonstrated in this example, using the methods of FIG. 1 and FIG. 2, if an optimistic read of a data block is not valid, the invalid read is detected and a valid read is performed after permission is received to access the data block.

Switching Between Non-Optimistic and Validated Optimistic Reads

As described above, if the optimistic read is valid, the latency can be several percent to several tens percent less than the latency of a non-optimistic read. However, if an optimistic read is invalid, the latency is about the same to somewhat greater than the latency of the non-optimistic method. If the optimistic read is invalid in embodiments using the version-number validity checks, latency can be much worse than in the non-optimistic method.

The method described in this section determines whether to use validated optimistic reads or non-optimistic reads for the next several reads, based on recently observed ratios of valid optimistic reads to invalid optimistic reads. This method gracefully moves away from using optimistic reads when it is likely that such reads will be invalid and will increase latency over the latency of the non-optimistic methods.

Figure 4:
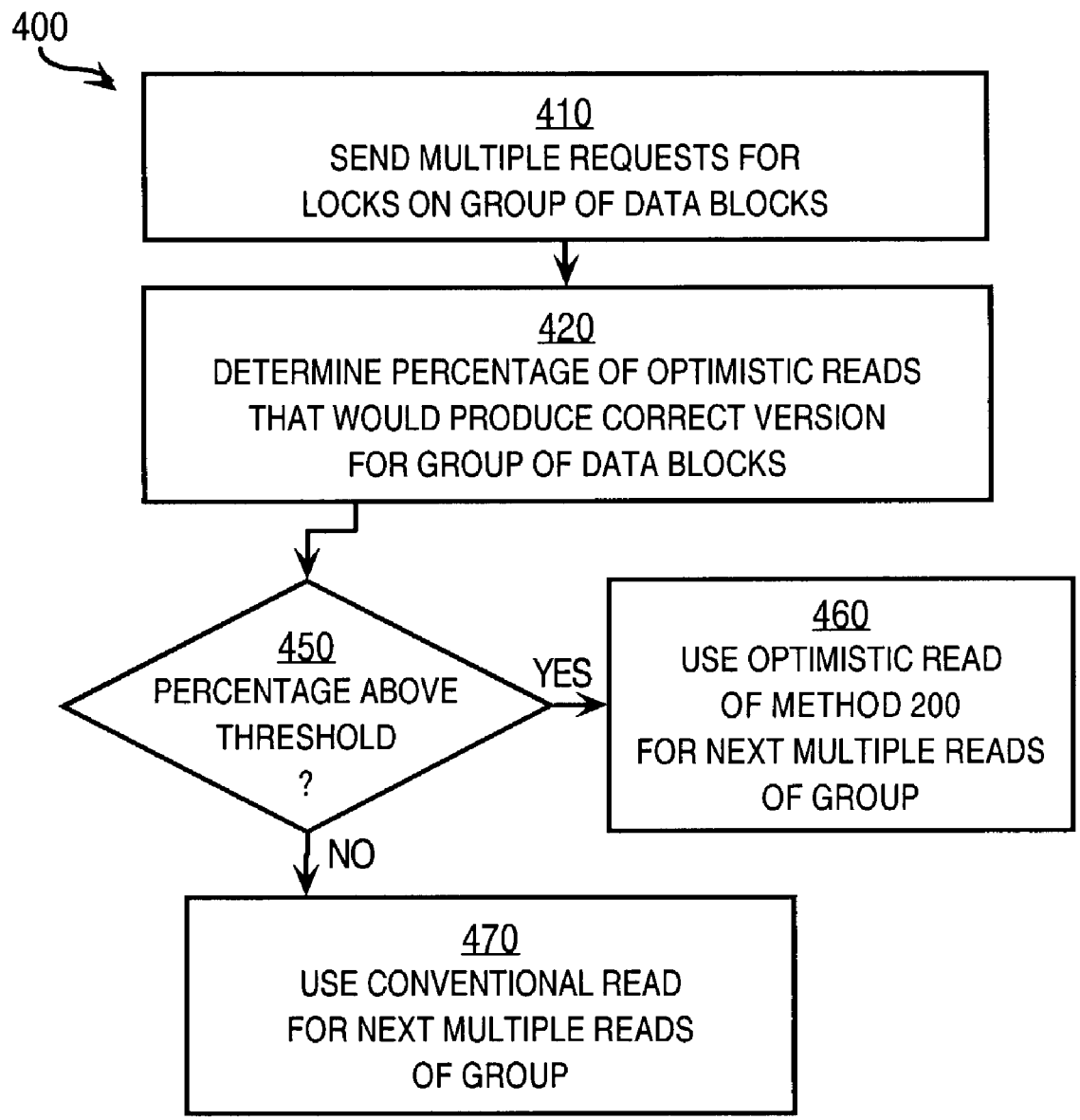
FIG. 4 is a flowchart that illustrates a method for determining when to use optimistic reads and when to use conventional reads, according to an embodiment.

FIG. 4 is a flowchart that illustrates a method 400 for determining when to use optimistic reads and when to use non-optimistic reads, according to an embodiment.

In step 410, multiple requests for locks on a group of data blocks, such as the data blocks associated with a database object like a table or index, are made in series, each request proceeding as described above. Based on the response to each request, it is determined whether an optimistic read would have been valid. This determination can be made whether an optimistic read has actually been performed or not. The results of the determination are stored for the last N requests. It is assumed for purposes of illustration that N is 100.

For example, using a lock manager to determine validity, as described above with reference to Table 1, an I/O process intending to use a non-optimistic read for a particular data block can determine a time T1 when it would have started an optimistic read. The I/O process includes the value of T1 in a request for a lock on the particular data block sent to the lock manager. Based on the value T1 and the release time in the circular buffer for the particular data block, the lock manager determines whether an optimistic read at T1 would be valid. Validity information indicating an optimistic read is valid is indicated by (VO); validity information indicating an optimistic read is invalid is indicated (IVO). The lock manager returns the lock and the data indicating validity of an optimistic lock. When the lock arrives, the I/O process starts retrieval of the particular data block, according to the non-optimistic read. In addition, the I/O process records the data indicating validity.

In some embodiments, when the I/O process employs a non-optimistic read, it does not provide the time T1. Instead, the lock manager includes with a lock for a requested data block an indication whether the lock was blocked (B) for any period of time by an exclusive lock held by another node. A lock received with an indication that the lock was blocked for some period of time would have resulted in an invalid optimistic read. A lock received with an indication that the lock was not blocked (unblocked, U) is assumed to have resulted in a valid optimistic read.

In step 420, the I/O process determines for a set of the most recent reads, what percentage of the reads were or could have been valid optimistic reads. For example, it is assumed that for the last 100 reads of a particular table, the I/O process performed non-optimistic reads and recorded the statistics listed in Table 2.

TABLE 2

Sample statistics showing efficacy of optimistic reads.

| Valid Optimistic (VO) | Invalid Optimistic (IVO) | Unblocked Conv. (U) | Blocked Conv. (B) |
|---|---|---|---|
| — | — | 91 | 9 |

In this example, an optimistic read probably could have been used successfully 91% of the time, given by the ratio U/(U+B).

For another example, it is assumed that for the last 100 reads of a different table, the I/O process performed optimistic reads and recorded the statistics listed in Table 3.

TABLE 3

Sample statistics showing efficacy of optimistic reads.

| Valid Optimistic (VO) | Invalid Optimistic (IVO) | Unblocked Conv. (U) | Blocked Conv. (B) |
|---|---|---|---|
| 55 | 45 | — | — |

In this example, an optimistic read was used successfully 55% of the time, given by the ratio VO/(VO+IVO).

For another example, it is assumed that for the last 100 reads of a third table, the I/O process alternately performed optimistic reads and non-optimistic reads and recorded the statistics listed in Table 4.

TABLE 4

Sample statistics showing efficacy of optimistic reads.

| Valid Optimistic (VO) | Invalid Optimistic (IVO) | Unblocked Conv. (U) | Blocked Conv. (B) |
|---|---|---|---|
| 45 | 5 | 47 | 3 |

In this example, an optimistic read was or could have been used successfully 92% of the time, given by the ratio (VO+U)/(VO+IVO+U+B).

A threshold percentage or ratio can be determined that indicates when the savings of the valid optimistic reads exceeds the costs of invalid optimistic reads. For purposes of illustration it is assumed that a valid optimistic read reduces latency by 500 microseconds, the time to obtain an unblocked lock, and an invalid optimistic read increases latency by 250 microseconds, the time to start the retrieval of the invalid block plus the extra time for the lock manager and I/O process to determine invalidity. Then a threshold X of successful optimistic reads over which the savings from optimistic reads exceed the cost can be determined as follows:

$$\text{savings} = X*500 = \text{cost} = (1-X)*250$$

$$X = 33.3\%.$$

In step 450, the I/O process determines whether the percentage of observed valid or potentially valid optimistic reads exceeds the threshold. The percentage of valid or potentially valid optimistic reads (PV) in the set of N most recent reads is given by $$PV=(VO+U)/(VO+U+IVO+B).$$

If PV exceeds X, then the savings of optimistic reads exceeds the cost, and control passes to step 460 to use optimistic reads for next one or more reads of the table. If PV is less than X, then the costs of optimistic reads exceeds the savings, and control passes to step 470 to use non-optimistic reads for the next one or more reads of the table.

In some embodiments in which the lock manager returns data indicating validity based on a T1 provided even for non-optimistic reads, as described above, U and B may be replaced by the number of non-optimistic reads for which an optimistic read would have been valid (CVO) and the number of non-optimistic reads for which an optimistic read would have been invalid (CIVO).

Although illustrated for a percentage of valid or potentially valid optimistic reads (PV), other performance measures may be used in other embodiments. For example, the percentage of wasted effort (PWE) can be used as the performance measure. In this case the determination to use optimistic reads is based on the observed PWE being below some threshold Y. In one embodiment, PWE is computed as follows:

$$PWE=(IVO+B)/(VO+U+IVO+B)$$

In another embodiment, PWE may be approximated as follows:

$$PWE \approx (IVO)/(VO+U+IVO+B).$$

In this embodiment, Y is computed as follows
wasted effort of invalid optimist read=$(Y)*250=$
wasted effort of unblocked non-optimistic read=$(1-Y)*500$
Y=66.7%.

The method described in this section dynamically and gracefully moves away from using optimistic reads when it is likely that such reads will be invalid and will increase latency over the latency of the non-optimistic methods. The method also dynamically moves toward using optimistic reads when it is likely that such reads will be valid sufficiently often to decrease latency from the latency of the non-optimistic methods.

Hardware Overview

Figure 5:
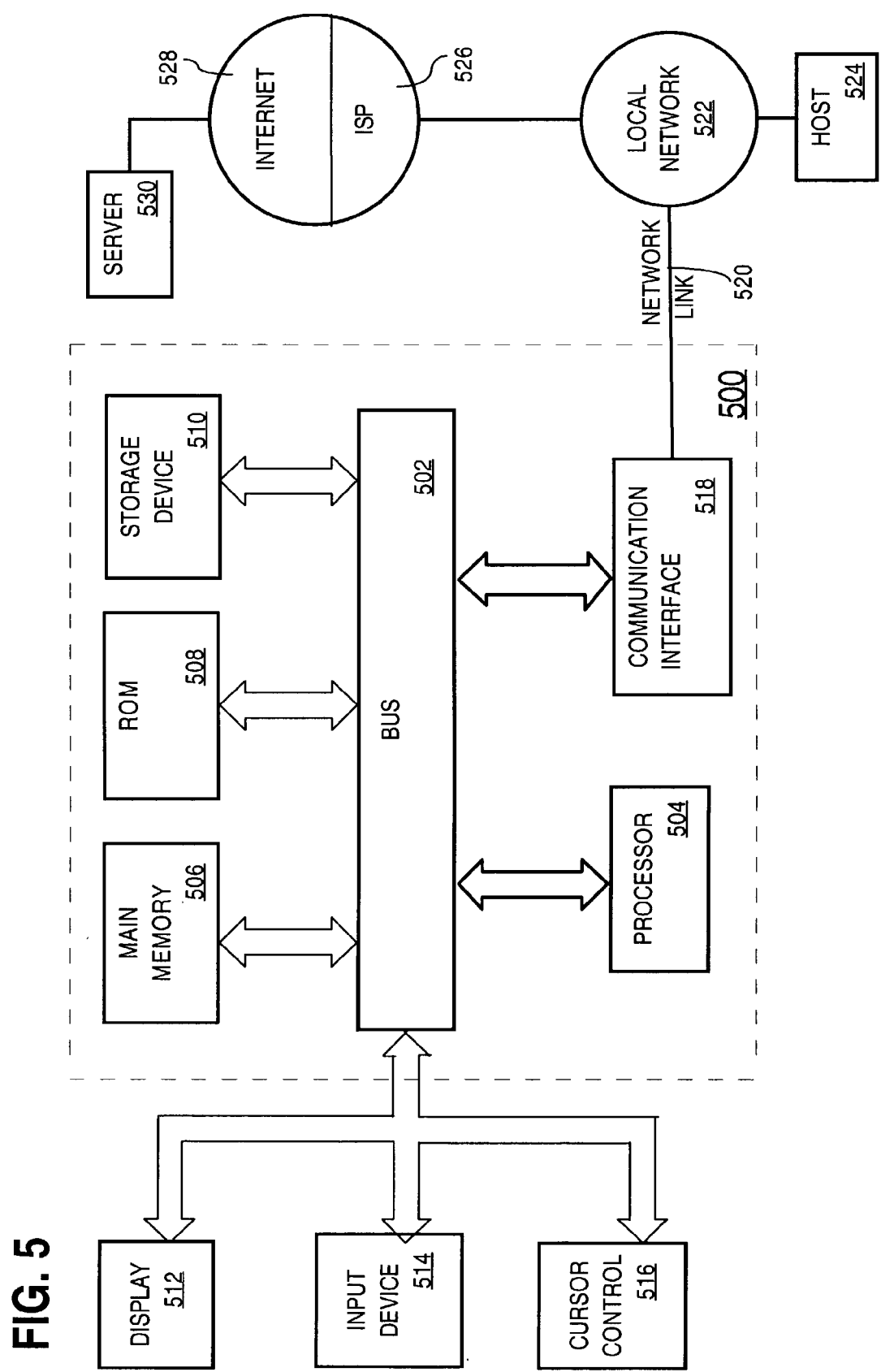
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for obtaining, at a first node of a plurality of nodes, a resource that does not currently reside in a cache associated with the first node, the method comprising the steps of:
    sending a request for permission to access the resource;
    before receiving a response to the request, initiating an operation to retrieve the resource into the first node;
    receiving the response to the request, said response indicating whether or not the first node has permission to access the resource;
    after receiving the response, determining whether the operation results in a correct version of the resource being retrieved into the first node;
    receiving within the first node, a returned resource in response to the operation; and
    determining whether the first node can use the returned resource which was retrieved into the first node by the operation, based on (a) whether the operation resulted in the correct version and (b) whether the response indicates that the first node has permission to access the resource.

2. The method of claim 1, further comprising, if it is determined that the operation will not result in the correct version, then initiating another operation to retrieve the resource.

3. A computer-readable medium carrying one or more sequences of instructions which, when executed by one or more processors, causes the one or more processors to perform the method recited in claim 2.

4. A computer-readable medium carrying one or more sequences of instructions which, when executed by one or more processors, causes the one or more processors to perform the method recited in claim 1.

5. A computer implemented method for obtaining, at a first node of a plurality of nodes, a resource that does not currently reside in a cache associated with the first node, the method comprising the steps of:
    sending a request for permission to access the resource;
    before receiving a response to the request, initiating an operation to retrieve the resource into the first node;
    receiving the response to the request, said response indicating whether or not the first node has permission to access the resource;
    after receiving the response, determining whether the operation results in a correct version of the resource being retrieved into the first node;
    receiving within the first node, a returned resource in response to the operation; and
    determining whether the first node can use the returned resource which was retrieved into the first node by the operation, based on (a) whether the operation resulted in the correct version and (b) whether the response indicates that the first node has permission to access the resource, wherein:
        first sequence data indicates a most current version of the resource;
        second sequence data indicates a version of the returned resource; and
        determining whether the operation will result in a correct version further comprises determining whether the second sequence data indicates a version that is not before a version indicated by the first sequence data.

6. The method of claim 5, wherein the second sequence data indicates a time that the operation to retrieve the resource was initiated.

7. The method of claim 6, wherein the first sequence data indicates a latest time that the resource was written by any node of the plurality of nodes.

8. A computer-readable medium carrying one or more sequences of instructions which, when executed by one or more processors, causes the one or more processors to perform the method recited in claim 5.

9. The method of claim 6, wherein
    a lock mechanism provides consistency for content of the resource among the plurality of nodes, and
    the first sequence data indicates a latest time that a different node than the first node released a lock that is used for changing content in the resource.

10. A computer-readable medium carrying one or more sequences of instructions which, when executed by one or more processors, causes the one or more processors to perform the method recited in claim 9.

11. A computer-readable medium carrying one or more sequences of instructions which, when executed by one or more processors, causes the one or more processors to perform the method recited in claim 6.

12. The method of claim 5, said step of determining whether the second sequence data indicates a version that is not before the version indicated by the first sequence data further comprising resetting at least one of the first sequence data and the second sequence data based on expected differences among a plurality of clocks on the plurality of nodes.

13. A computer-readable medium carrying one or more sequences of instructions which, when executed by one or more processors, causes the one or more processors to perform the method recited in claim 12.

14. The method of claim 5, said step of receiving the response further comprising extracting from the response the first sequence data.

15. A computer-readable medium carrying one or more sequences of instructions which, when executed by one or more processors, causes the one or more processors to perform the method recited in claim 14.

16. The method of claim 5, wherein:
said step of receiving the response further comprises extracting from the response the first sequence data indicating a latest version number for the resource among the plurality of nodes; and
said step of receiving the returned resource further comprises extracting from the returned resource the second sequence data indicating a version number for the returned resource.

17. A computer-readable medium carrying one or more sequences of instructions which, when executed by one or more processors, causes the one or more processors to perform the method recited in claim 16.

18. A computer-readable medium carrying one or more sequences of instructions which, when executed by one or more processors, causes the one or more processors to perform the method recited in claim 5.

19. A computer implemented method for obtaining, at a first node of a plurality of nodes, a resource that does not currently reside in a cache associated with the first node, the method comprising the steps of:
sending a request for permission to access the resource wherein sending the request includes, in the request, data indicating a time that the operation to retrieve the resource was initiated and sending the request to a lock manager process for providing consistency of content for the resource among the plurality of nodes;
before receiving a response to the request, initiating an operation to retrieve the resource into the first node;
receiving the response to the request, said response indicating whether or not the first node has permission to access the resource;
after receiving the response, determining whether the operation results in a correct version of the resource being retrieved into the first node;
receiving within the first node. a returned resource in response to the operation; and
determining whether the first node can use the returned resource which was retrieved into the first node by the operation. based on (a) whether the operation resulted in the correct version and (b) whether the response indicates that the first node has permission to access the resource.

20. The method of claim 19, wherein:
said step of receiving the response further comprises receiving the response from the lock manager, and extracting from the response validity data indicating whether the operation will result in a correct version; and
said step of determining whether the operation will result in the correct version further comprises determining whether the validity data indicates the operation will result in the correct version.

21. A computer-readable medium carrying one or more sequences of instructions which, when executed by one or more processors, causes the one or more processors to perform the method recited in claim 20.

22. A computer-readable medium carrying one or more sequences of instructions which, when executed by one or more processors, causes the one or more processors to perform the method recited in claim 19.

23. A computer implemented method for obtaining, at a first node of a plurality of nodes, a resource that does not currently reside in a cache associated with the first node, the method comprising the steps of:
measuring performance data related to a fraction of a plurality of operations initiated to retrieve a set of one or more resources that would result in the correct versions of the set of one or more resources if the plurality of operations were initiated before receiving corresponding responses granting permission to access the set of one or more resources;
determining whether the performance data is below a threshold value; and
if the performance data is below the threshold value, then performing the step of:
initiating the operation to retrieve the resource only after receiving the response, and;
skipping said step of initiating the operation to retrieve the resource before receiving the response to the request;
if the performance data is not below the threshold value then performing the step of:
sending a request for permission to access the resource;
before receiving a response to the request, initiating an operation to retrieve the resource into the first node;
receiving the response to the request, said response indicating whether or not the first node has permission to access the resource;
after receiving the response, determining whether the operation results in a correct version of the resource being retrieved into the first node; receiving within the first node, a returned resource in response to the operation; and
determining whether the first node can use the returned resource which was retrieved into the first node by the operation, based on (a) whether the operation resulted in the correct version and (b) whether the response indicates that the first node has permission to access the resource.

24. The method of claim 23 further comprising, if the performance data is not below the threshold value, then performing said step of initiating the operation to retrieve the resource before receiving a response granting permission to access the resource.

25. A computer-readable medium carrying one or more sequences of instructions which, when executed by one or more processors, causes the one or more processors to perform the method recited in claim 24.

26. A computer-readable medium carrying one or more sequences of instructions which, when executed by one or more processors, causes the one or more processors to perform the method recited in claim 23.

27. A computer implemented method for obtaining, at a first node of a plurality of nodes, a resource that does not currently reside in a cache associated with the first node, the method comprising the steps of:
- receiving at a lock manager for providing consistency of contents of resources among the plurality of nodes, from the first node, a request for permission to access the resource;
- determining first data that indicates a latest version of the resource;
- generating a lock for the first node for accessing the resource; and
- sending to the first node a response including the lock and validity information based on the first data, wherein the validity information is for determining at the first node whether an operation initiated at the first node to access the resource results in a correct version of the resource.

28. The method of claim 27, wherein the validity information includes the first data.

29. A computer-readable medium carrying one or more sequences of instructions which, when executed by one or more processors, causes the one or more processors to perform the method recited in claim 28.

30. The method of claim 27, said step of determining the first data further comprising the step of receiving, at the lock manager from a second node different than the first node, a most recent message releasing a lock for changing the contents of the resource.

31. The method of claim 30, said step of determining the first data further comprising the step of setting the first data to indicate a time that the most recent message was received at the lock manager.

32. A computer-readable medium carrying one or more sequences of instructions which, when executed by one or more processors, causes the one or more processors to perform the method recited in claim 31.

33. A computer-readable medium carrying one or more sequences of instructions which, when executed by one or more processors, causes the one or more processors to perform the method recited in claim 30.

34. The method of claim 27, further comprising the steps of:
- extracting from the request second data indicating a version of the resource returned to the first node in response to a process initiated to retrieve the resource; and
- determining the validity information based on comparing the first data to the second data.

35. The method of claim 34, said step of determining the validity information further comprising determining whether the second data indicates a version that is not before a version indicated by the first sequence data.

36. A computer-readable medium carrying one or more sequences of instructions which, when executed by one or more processors, causes the one or more processors to perform the method recited in claim 35.

37. The method of claim 34, wherein:
- the second data indicates a time no later than a time when the first node initiated the process to retrieve the resource; and
- the first data indicates a time no earlier than a time when a node of the plurality of nodes last changed content for the resource.

38. A computer-readable medium carrying one or more sequences of instructions which, when executed by one or more processors, causes the one or more processors to perform the method recited in claim 37.

39. A computer-readable medium carrying one or more sequences of instructions which, when executed by one or more processors, causes the one or more processors to perform the method recited in claim 34.

40. A computer-readable medium carrying one or more sequences of instructions which, when executed by one or more processors, causes the one or more processors to perform the method recited in claim 27.

* * * * *

UNITED STATES PATENT AND TRADEMARK OFFICE
CERTIFICATE OF CORRECTION

PATENT NO. : 6,970,872 B1
DATED : November 29, 2005
INVENTOR(S) : Sashikanth Chandrasekaran et al.

It is certified that error appears in the above-identified patent and that said Letters Patent is hereby corrected as shown below:

Column 21,
Line 61, delete "operation. based" and insert -- operation, based --.

Signed and Sealed this

Fourteenth Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,970,872 B1  
APPLICATION NO. : 10/202155  
DATED : November 29, 2005  
INVENTOR(S) : Sashikanth Chandrasekaran et al.

Page 1 of 1

It is certified that error appears in the above-identified patent and that said Letters Patent is hereby corrected as shown below:

Column 21,  
Claim 18, line 37: Delete "claim 5" and insert -- claim 7 --.

Signed and Sealed this

Fifth Day of September, 2006

JON W. DUDAS  
*Director of the United States Patent and Trademark Office*